US012763655B2

(12) United States Patent
Frommer

(10) Patent No.: US 12,763,655 B2
(45) Date of Patent: Oct. 13, 2026

(54) SUPERCONDUCTOR-BASED ENGINE

(71) Applicant: Nechemya Frommer, Jerusalem (IL)

(72) Inventor: Nechemya Frommer, Jerusalem (IL)

( * ) Notice: Subject to any disclaimer, the term of this patent is extended or adjusted under 35 U.S.C. 154(b) by 0 days.

(21) Appl. No.: 18/386,512

(22) Filed: Nov. 2, 2023

(65) Prior Publication Data

US 2024/0063705 A1 Feb. 22, 2024

Related U.S. Application Data

(63) Continuation-in-part of application No. PCT/IL2022/050445, filed on May 1, 2022.

(30) Foreign Application Priority Data

May 4, 2021 (IL) .......................................... 282927

(51) Int. Cl.
*H02K 55/06* (2006.01)

(52) U.S. Cl.
CPC .................................... *H02K 55/06* (2013.01)

(58) Field of Classification Search
CPC ......... H02K 55/06; H02K 35/02; H02K 55/00
See application file for complete search history.

(56) References Cited

U.S. PATENT DOCUMENTS 5,159,219 A * 10/1992 Chu ...................... F16C 32/044 310/90.5
2002/0180283 A1* 12/2002 Dickinson .............. H02K 55/06 310/52
2006/0087179 A1* 4/2006 Travers .................. H02K 33/00 310/15
2015/0214795 A1 7/2015 Dakhil

FOREIGN PATENT DOCUMENTS

FR 2986119 A3 7/2013
JP 63305745 A * 12/1988

OTHER PUBLICATIONS

English translation of FR-2986119-A3 (Year: 2013).*
English translation of JP-63305745-A (Year: 1988).*
International Search Report (ISR) for PCT/IL2022/050445 mailed Jul. 28, 2022 (3 pages).
Written Opinion for PCT/IL2022/050445 mailed Jul. 28, 2022 (6 pages).

* cited by examiner

*Primary Examiner* — Tulsidas C Patel
*Assistant Examiner* — Joshua Kiel M Rodriguez
(74) *Attorney, Agent, or Firm* — Shumaker, Loop & Kendrick, LLP

(57) ABSTRACT

A superconductor-based engine including a temperature-controlled superconductor that acts as a source for mechanical motion transmission. In one aspect, an oscillating motion is obtained in accordance with switching alternately between a superconductivity state and a non-superconductivity state of the temperature-controlled superconductor.

9 Claims, 7 Drawing Sheets

SUPERCONDUCTOR-BASED ENGINE

FIELD OF THE INVENTION

The present invention is in the field of electric generators. More specifically, the invention relates to the field of an electric generator that is suitable to operate on a temperature-controlled superconductor as a source of initial movement of the components of the generator.

BACKGROUND OF THE INVENTION

An electric generator translates a mechanical input into an electrical current. It is known, for example, to utilize a belt-driven shaft to provide an input to the alternator. Alternators utilize induction to generate electricity. It is known, for example, to generate electric current utilizing relative motion between permanent magnets and windings (i.e., coils) of electrically conductive wire to generate current. Different configurations of magnets and windings are being used to different effects upon the generated current.

For example, the generator can be a linear generator that includes a stationary cylinder and a piston located within the cylinder and is suitable to move within the cylinder linearly. By positioning a magnet (or magnets) on the inner wall of the cylinder and positioning coils on the outer surface of the piston, the movement of said piston inside said cylinder creates the flow of electrical current through the coils. According to other exemplary linear generators, the positioning of the magnets) and coils is opposite so that the magnets are positioned on the outer surface of the piston, while the coils are placed on the inner surface of the cylinder.

Many opposed-piston engines include a combustion chamber disposed between two pistons according to the prior art. As combustion occurs within the combustion chamber, the pistons are driven in opposite directions, away from the combustion chamber. Such engines also include a rebound mechanism suitable to cause the pistons to return toward the center of the apparatus in preparation for the next cycle, thus preventing the need to use a crankshaft.

Quantum locking, also known as flux pinning, occurs when a superconductor is exposed to a magnetic field and the field lines become trapped (pinned) in the superconductor, creating a locked position relative to the magnetic field source. This phenomenon can potentially hinder the movement of the superconductor (or an object attached to it) within a magnetic field, as the superconductor will resist changes in its position relative to the magnetic field.

It is an object of the present invention to provide a superconductor-based engine, and a method for its operation, that overcomes the challenges associated with quantum locking, ensuring continuous and efficient motion.

It is another object of the present invention to provide a generator that allows an operation with a temperature-controlled superconductor.

Other objects and advantages of the invention will become apparent as the description proceeds.

SUMMARY OF THE INVENTION

According to one aspect, the present invention is a superconductor-based engine comprising a temperature-controlled superconductor that acts as a source for mechanical motion transmission.

In one aspect, the temperature-controlled superconductor is located within a chamber that is adapted to receive a chilling fluid suitable to decrease the temperature of said superconductor in order to achieve a superconducting state.

In one aspect, the chamber comprises an intake port through which the chilling fluid enters said chamber in order to reduce the temperature of the superconductor.

In one aspect, at least one pair of magnets and at least one element that stores mechanical energy to which each magnet is attached are configured to perform a linear motion in accordance with the superconducting state of the superconductor, wherein each magnet is configured to linearly move inside an inner void of a lateral chamber with respect to the superconductor chamber In one aspect, an oscillating motion of the magnets is obtained in accordance with switching alternately between the superconductivity state and a non-superconductivity state of the temperature-controlled superconductor.

In yet another aspect, the engine comprises an essentially round superconductor having two peripheral chambers, concentrically confined by a rotor having a magnetic portion, wherein said two peripheral chambers are adapted to allow the inlet of chilling fluid from a fluid tank through corresponding tubes, thus to enable the temperature reduction of said superconductor, resulting in the rotation of said rotor.

In one aspect, the chilling fluid is liquid nitrogen.

In one aspect, a regulating unit controls the insertion of the chilling fluid into the superconductor chamber. The regulating unit may comprise a flow valve, and wherein a computerized controller controls the regulating unit.

In one aspect, each pair of magnets are arranged to attract or repel each other during the superconducting state.

In yet another aspect, the engine further comprises at least one electronic unit and/or sensors. The electronic unit may communicate with one or more sensors in a wired or wireless manner.

In one aspect, the electronic unit is configured to receive data from the one or more sensors, process the received data, and accordingly control the insertion of the chilling fluid into the superconductor chamber.

In yet another aspect, the present invention relates to a superconductor-based engine that comprises a cylinder that includes a chamber, a superconductor located within said chamber, at least one set of magnets, wherein each magnet is suitable to move inside an inner void of a lateral chamber linearly, and wherein each of said magnets is connected to an element that stores mechanical energy. According to one embodiment of the invention, the superconductor chamber further comprises at least one opening suitable to allow the inlet of fluids suitable to reduce the temperature of said superconductor.

According to an embodiment of the invention, the at least one opening is suitable to be connected to a fluid source by suitable connection means, such as suitable connecting tubes. According to one embodiment of the invention, the fluid source is a nitrogen tank. According to another embodiment of the invention, the connection means between the opening and the fluid source comprise a controllable flow valve.

According to another embodiment of the invention, the element that stores mechanical energy comprises a rebound mechanism. Such a rebound mechanism can be, for example, a mechanical spring.

In yet another aspect, the present invention is a superconductor-based engine comprising:

- a temperature-controlled superconductor configured to achieve a superconducting state at very cold temperatures;
- a chamber housing the superconductor;

an intake port for introducing a chilling fluid into said chamber to reduce the temperature of the superconductor;

at least one pair of magnets positioned in proximity to the superconductor; and at least one pair of mechanical energy storage elements attached to the magnets, wherein the storage elements exert an opposing force approximately proportional to their change in length.

In one aspect, the engine is in the form of a linear electric generator. In another aspect, the engine is in the form of a rotary engine comprising a stator, a rotor, and the temperature-controlled superconductor acting as a source for mechanical motion transmission between the stator and the rotor.

In one aspect, the superconductor-based engine further comprises at least one sensor configured to monitor at least one of temperature, speed, and motion of the engine components.

In one aspect, the superconductor-based engine further comprises an electronic unit configured to receive information from the at least one sensor and output of the apparatus, and to perform calculations based on the received information.

In one aspect, the mechanical energy storage elements are selected from a group consisting of springs or other suitable from of elastic objects.

In one aspect, the superconductor-based engine further comprises a pair of permanent magnets with opposing poles placed around the superconductor.

In one aspect, the superconductor-based engine further comprises a second superconductor placed parallel to the first superconductor.

In one aspect, the superconductor-based engine further comprises repelling magnets integrated into the rotor as a motor, and additional magnets placed around the superconductor as a stator.

In one aspect, the superconductor exhibits magnetic properties when in the superconducting state.

In one aspect, the motion of the magnets is achieved and maintained through a combination of the superconductor's transition between superconducting and non-superconducting states, and the mechanical energy storage elements.

In one aspect, the engine is configured to operate in cycles of cooling and warming of the superconductor to achieve repeated mechanical motion.

In yet another aspect, the present invention relates to a method of operating a superconductor-based engine, comprising:

introducing a chilling fluid into a superconductor chamber to cool a superconductor to a superconducting state;

utilizing the superconductor in the superconducting state to generate a mechanical motion;

converting the mechanical motion to electrical energy; and regulating the introduction of the chilling fluid based on feedback from sensors monitoring the engine's performance.

In one aspect, the mechanical motion is linear motion in the case of a linear electric generator, or rotational motion in the case of a rotary engine.

A DETAILED DESCRIPTION OF THE INVENTION

Figure 1:
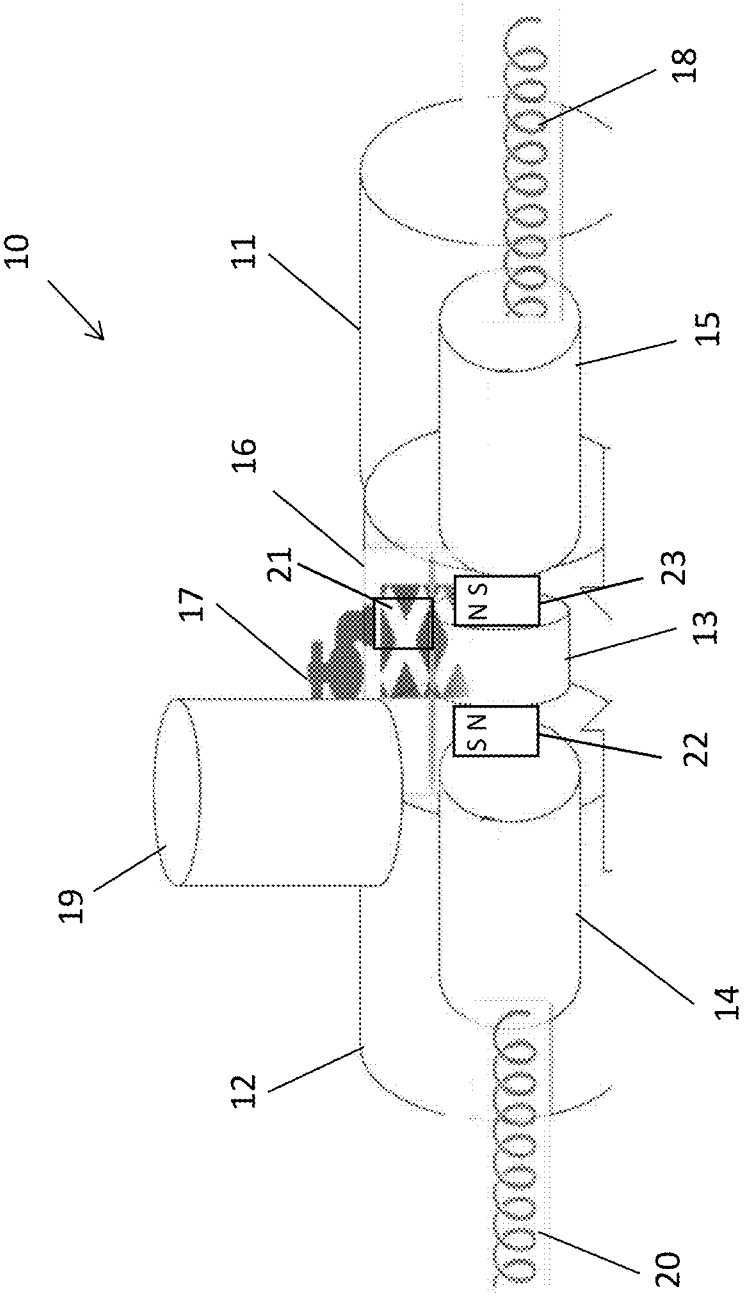
FIG. 1 is a transparent perspective view of a linear configuration of a superconductor-based engine in an inactive state, according to an embodiment of the invention.

The present invention relates to a superconductor-based engine, which can also be referred to simply as "engine" along the description for the sake of brevity. The Superconductor-Based Engine is a novel propulsion system that leverages the unique properties of superconductors, magnets, and precise temperature control to generate continuous motion and electricity. The engine is designed to overcome challenges associated with quantum locking, ensuring efficient and uninterrupted operation. This invention harnesses the unique properties of superconductors, particularly their ability to exhibit zero electrical resistance and expel external magnetic fields, a phenomenon known as the Meissner effect, when cooled to extremely low temperatures. This is in stark contrast to regular conductors, which allow magnetic fields to penetrate freely and exhibit electrical resistance.

One of the hallmark features of superconductors is "quantum locking" or "flux pinning," where a superconductor is trapped within a magnetic field, resulting in it being locked in space. In this state, the superconductor resists movement from its locked position, creating a stable, albeit stationary, system. To harness this property for motion transmission, the present invention integrates a temperature-controlled superconductor with a specific arrangement of magnets.

According to the present invention, the engine comprises a temperature-controlled superconductor that acts as a source for mechanical motion transmission. The engine suggested by the present invention utilizes the state of matter that has no electrical resistance and does not allow magnetic fields to penetrate, which can be achieved at very cold temperatures.

According to an embodiment of the invention, the engine can be in the form of a linear electric generator and may comprise a chamber (may also refer here as a superconductor chamber or a central chamber); a superconductor, which is located within the superconductor chamber; an intake port through which a chilling fluid (e.g., nitrogen) enters into the superconductor chamber in order to reduce the temperature of the superconductor; at least one pair of magnets; and at least one pair of elements that stores mechanical energy to which the magnets are attached (e.g., the elements can be a pair of springs or other forms of an elastic object that stores mechanical energy and exerts an opposing force approximately proportional to its change in length). According to another embodiment of the invention, the engine can be in the form of a rotary engine and may comprise a stator, a rotor, and a temperature-controlled superconductor that acts as a source for mechanical motion transmission between the stator and the rotor.

As will be further described with reference to the drawings, a significant advantage of the present invention is the use of a temperature-controlled superconductor that acts as a source for mechanical motion transmission. As a result, the magnets linearly oscillate. Using a chilling fluid to control the temperature of the superconductor replaces the use of a mechanical connecting rod for motion transmission, which allows the stroke-like linear motion of the magnets in their chamber to the activation of the elements that store mechanical energy (e.g., springs that when they are stretched (or compressed) from their resting position, they exert an opposing force approximately proportional to its change in length).

The operation of the engine is based on the insertion of a chilling fluid into the superconductor chamber. The chilling fluid is also referred to as "inlet fluid" and can be, for example, nitrogen.

The engine proposed in this invention utilizes the interaction between a cooled superconductor and repelling magnets to overcome the quantum locking effect. When the superconductor is chilled to a temperature where it exhibits superconducting properties, it enters a state where it can be influenced by nearby magnetic fields. The superconductor then interacts with the magnets, which are arranged to repel each other.

This repelling force between the magnets is a critical component of the invention, as it provides the necessary energy to overcome the quantum locking effect. When the superconductor is in its locked state, the repelling force of the magnets acts against this locking, causing the superconductor to move. This movement is then translated into mechanical motion, which can be harnessed for various applications.

Furthermore, the invention takes advantage of another unique property of superconductors: their ability to mimic the magnetic field of a magnet without requiring an external power source. In essence, the cooled superconductor acts similarly to an electromagnet, generating a magnetic field in response to the external magnets. However, unlike an electromagnet, the superconductor does not consume any electrical current to maintain this state.

By controlling the temperature of the superconductor, the invention can modulate its interaction with the magnets, and thus control the transmission of mechanical motion. When the temperature of the superconductor is raised, it loses its superconducting properties, diminishing the quantum locking effect and allowing the repelling magnets to move closer together. Conversely, when the temperature is lowered, the superconductor regains its properties, and the quantum locking effect is restored, forcing the magnets apart once again.

This cyclic interaction between the temperature-controlled superconductor and the repelling magnets forms the basis of the mechanical motion transmission in the engine proposed by the present invention. The precise control of the superconductor's temperature, combined with the strategic arrangement of repelling magnets, enables the conversion of magnetic interactions into usable mechanical motion, opening up new possibilities for energy-efficient and innovative engine designs.

Overcoming Quantum Locking

Quantum locking, or flux pinning, occurs in superconductors when they interact with magnetic fields, potentially hindering movement due to the trapped magnetic field lines. The Superconductor-Based Engine addresses this issue through several innovative strategies:

1. Dynamic Temperature Control: The engine actively controls the temperature of the superconductor, cycling between superconducting and non-superconducting states. This strategy allows for the temporary release of the quantum locking state, facilitating free movement and ensuring the controlled interaction of the superconductor with the magnetic field.
2. Synchronized Movement: A control system synchronizes the movement of the magnets and superconductor, ensuring that any potential quantum locking does not impede the engine's operation. Movements are timed with changes in the superconductor's temperature, providing periods of free movement that are crucial for continuous operation.
3. Strategic Magnet Arrangement: The engine utilizes a carefully designed arrangement of magnets, including repelling magnets and additional opposing magnets, to create a balanced and navigable magnetic field. This arrangement helps to mitigate the impact of quantum locking on the engine's movement.
4. Mechanical Energy Storage Elements: Components such as springs are integrated into the engine, storing mechanical energy that can be released to overcome resistance from quantum locking. This stored energy ensures a constant force is available to maintain motion, even in the presence of quantum locking.
5. Feedback and Control System: Continuous monitoring of the engine's components is achieved through a network of sensors, feeding data to a central control system. This system adjusts the engine's operation in real-time, addressing any issues related to quantum locking and ensuring optimal performance.

Linear and Rotary Engines

The Superconductor-Based Engine can be implemented in both linear and rotary configurations, each benefiting from the strategies to overcome quantum locking. In the linear engine, superconductors and magnets are aligned in a track, while in the rotary engine, they are positioned in a circular configuration. Both designs employ the aforementioned strategies to ensure smooth and uninterrupted operation.

Linear Electric Generator Embodiment:

In one embodiment, the engine functions as a linear electric generator, comprising:

1. A central chamber or superconductor chamber, housing the superconductor.
2. A chiller unit for providing chilling fluid (e.g., nitrogen) to control the temperature of the superconductor.
3. At least one pair of magnets, attached to elements that store mechanical energy (e.g., springs or other elastic objects).

The linear motion of the magnets is achieved through the temperature control of the superconductor. Chilling fluid from the chiller unit, introduced to the superconductor chamber (e.g., via an intake port of superconductor chamber), cools the superconductor to its superconducting state. In this state, the superconductor expels magnetic fields, creating a repelling force against the magnets. This repelling force is translated into linear motion, compressing or stretching the attached springs. When the chilling fluid is ceased, the temperature of the superconductor rises, weakening the repelling force and allowing the springs to return to their resting state, creating an oscillatory motion of the magnets.

To prevent quantum locking, which could resist changes in the position of the superconductor relative to the magnets, the temperature of the superconductor is meticulously controlled. The system is equipped with sensors and an electronic control unit to actively monitor the temperature and position of the superconductor and magnets. If signs of quantum locking are detected, the system adjusts the flow of chilling fluid, and if necessary, provides additional mechanical energy to maintain continuous motion (i.e., mechanical energy injection). The mechanical energy injection is described in further details hereafter.

Rotary Engine Embodiment:

In another embodiment, the engine functions as a rotary engine, comprising:

1. A stator and a rotor.
2. A chiller unit for providing chilling fluid (e.g., nitrogen) to control the temperature of the superconductor
3. A temperature-controlled superconductor acting as a source for mechanical motion transmission between the stator and rotor.

The operation is similar to the linear generator, where the chilling fluid controls the temperature of the superconductor, influencing the motion of the rotor relative to the stator. Sensors and an electronic control unit are again employed to monitor and maintain the optimal conditions, preventing quantum locking and ensuring continuous motion.

Advantages and Operation:

The use of a superconductor for mechanical motion transmission eliminates the need for mechanical connecting rods, providing a more efficient and direct conversion of mechanical motion to electrical energy. The described embodiments showcase the adaptability of the engine, capable of functioning as both a linear generator and a rotary engine, with the common advantage of utilizing a temperature-controlled superconductor to maintain continuous and optimized operation.

The drawings referenced provide visual representations of the described engine, illustrating the components and their interactions. The engine's adaptability, efficiency, and innovative use of superconductivity and mechanical motion transmission present a significant advancement in the field of energy generation. According to the present invention, references are made to the accompanying drawings in the following detailed description, which illustrate one exemplary embodiment of the invention. This embodiment may be combined with other components, other embodiments may be utilized, and other changes may be made without departing from the spirit or scope of the present invention.

FIG. 1 shows a transparent perspective view of a superconductor-based engine 10, according to one embodiment of the invention. Engine 10 comprises a superconductor chamber 16 housing a superconductor 13, flanked by a pair of lateral chambers 11 and 12 (e.g., in the form of a cylindrical body). Inside each lateral chamber are magnets 15 and 14, respectively. The inner volume of chamber 11 comprises the first magnet 15, and the inner volume of chamber 12 comprises the second magnet 14. Superconductor chamber 16 is adapted to receive chilling fluid, such as nitrogen, that is suitable to chill superconductor 13 (i.e., in order to decrease the temperature of superconductor 13 and to achieve a superconducting state).

Within the engine 10, the pair of magnets 14, 15 is positioned in close proximity to the superconductor. Additionally, there are elements that store mechanical energy, such as springs 18, 20, to which magnets 14, 15 are attached. The springs 18, 20 serve to convert magnetic interactions into usable mechanical motion.

An intake port 21 is integrated into the design of superconductor chamber 16, allowing a chilling fluid, such as liquid nitrogen, to enter superconductor chamber 16 and cool superconductor 13 to its superconducting state. The flow of the chilling fluid through intake port 21 is precisely controlled to manipulate the temperature of the superconductor and, consequently, its magnetic properties. This control is crucial for the optimal operation of the engine, as it allows for the transition of the superconductor between its normal state and its superconducting state, facilitating the generation of mechanical motion.

When chilling fluid, such as nitrogen, is not actively being supplied, the magnets 14, are positioned close to the superconductor 13 due to the attraction forces present in the non-superconducting state of the superconductor. Springs 18, 20 are in a tensioned state, storing mechanical energy. The engine is at rest, ready for activation upon the introduction of chilling fluid. In this embodiment, each of the lateral chambers 11, 12 has a cylindrical form, and their diameter is identical.

Figure 2:
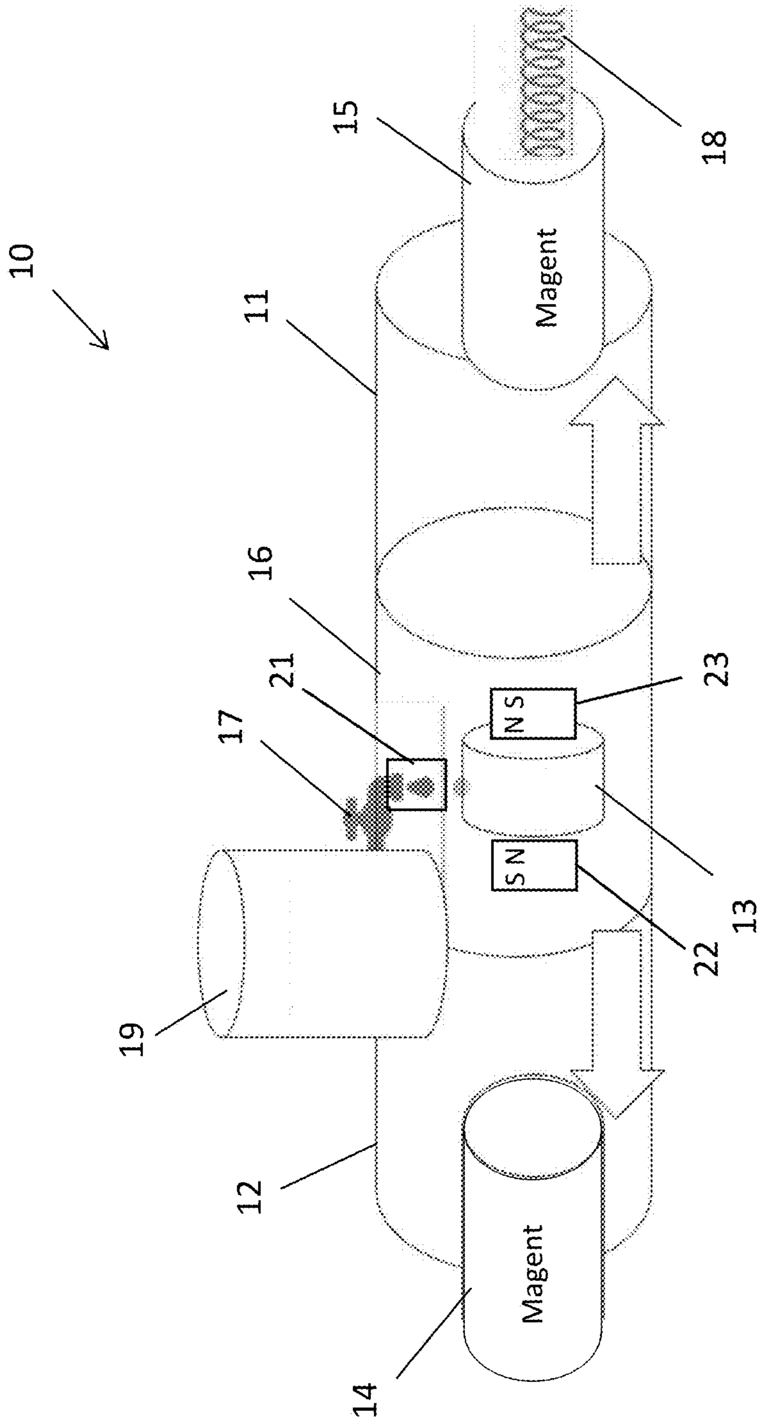
FIG. 2 is a transparent perspective view of the superconductor-based engine of FIG. 1 in an active state.

FIG. 2 illustrates the superconductor-based engine 10 in an active state. Chilling fluid has been introduced into the superconductor chamber 16, cooling the superconductor 13 to a superconducting state. This state induces a repulsive force between the superconductor and the magnets 14, 15, causing them to move away from the superconductor 13 and towards the ends of the lateral chambers 11, 12. As the magnets move, they compress (or extend) the springs 18, 20, converting the kinetic energy of the magnets into stored potential energy in the springs. This process represents the power stroke of the engine, converting thermal energy from the chilling fluid into mechanical energy.

In the active state the two magnets 14, 15 move in the opposite direction with respect to one another (i.e., move away from the superconductor 13), this occurs when chilling fluid enters superconductor chamber 16 and decreases the temperature of superconductor 13 to a superconductivity state. In the inactive state the two magnets 14, 15 move toward each other (i.e., they attracted and moved toward the superconductor 13). This occurs when the chilling fluid ceases entering superconductor chamber 16, thus, the temperature of superconductor 13 increases and causes the re-attraction of magnets 14, 15 toward superconductor 13.

For example, the magnets 14, 15 move away from superconductor 13 in a linear motion, due to the return of springs 18, 20 to their compressed position (as shown in FIG. 2). When the temperature of superconductor 13 increases (i.e., a non-superconducting state), magnets 14, 15 are attracted and linearly move toward each other (i.e., they move toward superconductor 13), and the springs 18, 20 become extended (i.e., as shown in FIG. 1). At this point, another cycle of linear movement and spring tension/release can occur. In this embodiment, spring 18 and 20 are used as the mechanical energy storage elements, but of course other mechanical arrangement can be used for acting as mechanical energy storage elements, such as compressed air reservoir connected to a piston, flywheel energy storage system, etc.

According to an embodiment of the invention, depending on the required implementation, the arrangement of the magnets in combination with mechanical energy storage elements in order to generate linear movement cycles of mechanical motion transmission can be provided in a variety of ways. For example, instead of a magnetic attraction form, the magnets can be arranged in a way of magnetic repelling form.

According to an embodiment of the invention, the operation of a linear electric generator based on the superconductor-based engine 10, may occur in several phases:

Cooling Phase: The chilling fluid enters superconductor chamber 16 through intake port 21, reducing the temperature of superconductor 13 and transitioning it into a superconducting state. In this state, superconductor 13 exhibits the Meissner effect, repelling the magnetic fields of the nearby magnets 14, 15.

Energy Storage Phase: As the magnets 14, 15 are repelled by superconductor 13, they compress or stretch the attached springs 18, 20, storing mechanical energy in the process.

Oscillation Phase: Once the repulsive force on the magnets 14, 15 is diminished (for example, by reducing the flow of chilling fluid and allowing the superconductor 13 to warm up), the stored energy in the springs 18, 20 is released. This causes the magnets 14, 15 to oscillate back towards their original position.

Mechanical Motion Output: The continuous cycle of cooling, energy storage, and oscillation results in a consistent mechanical motion. This motion can be harnessed for various applications, including the generation of electrical energy or to drive mechanical systems.

By optimizing the properties of the superconductor, springs, and magnets, along with precise control of the chilling fluid flow, the superconductor-based engine 10 achieves efficient conversion of thermal and magnetic interactions into mechanical motion. This innovative approach presents a versatile and effective solution for generating energy.

Figure 4:
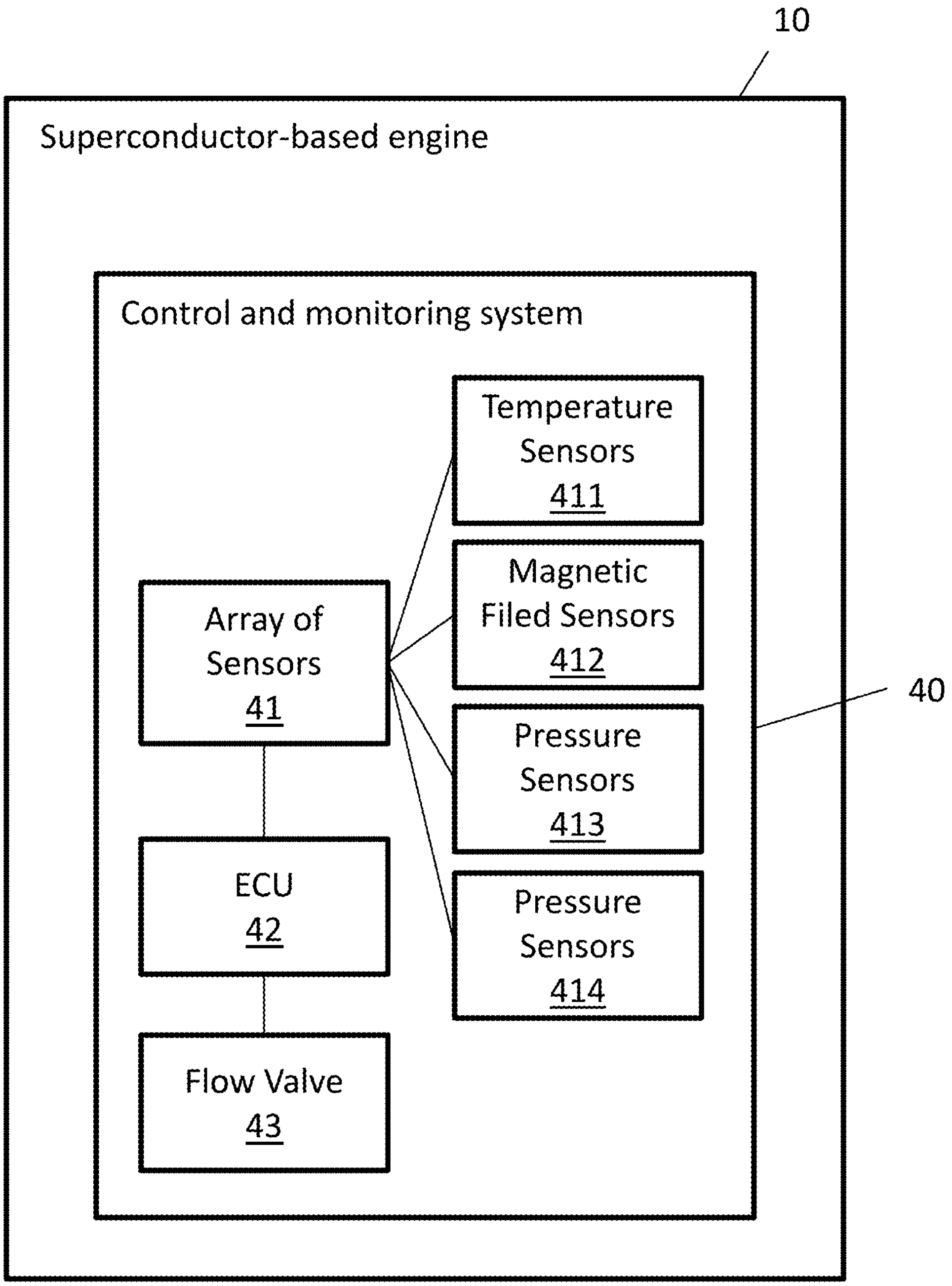
FIG. 4 shows a block diagram of the superconductor-based engine of FIG. 1 with an integrated control and monitoring system, according to an embodiment of the invention.

According to some embodiments of the invention, engine 10 comprises one or more sensors (e.g. see FIG. 4). Such sensors can provide, for example, temperature, speed or motion monitoring, thus providing the ability to process such measurements and use them to control the apparatus and enable to schedule the cycles of engine 10. According to one embodiment of the invention, such sensors can be located at different locations inside engine 10, which do not interfere with the movements of the internal components and are suitable to communicate with an external electronic unit. According to another embodiment of the invention, such sensors are connected to an electronic unit by wires and reach the inner void of engine 10 by passing through designated drills. Although the drills are not shown in the figures, it is obvious to any person skilled in the art how to combine them with the apparatus of the present invention.

According to one embodiment of the invention, engine 10 also comprises an electronic unit (See ECU of FIG. 4), which receives information from the different sensors and the output of the apparatus (such as electric current, voltage, frequency, etc.), and according to provide different calculations.

According to another embodiment of the invention, the electronic unit can also send commands to a user and/or to regulating components, such as flow valves or any other components that control engine 10. The gathered information regarding the performance of the engine can indicate the need for change, for example, the supply rate of the chilling fluid. FIGS. 1 and 2 show an exemplary flow valve 17 that controls fluid flow from its source—in this case, a nitrogen tank 19, into superconductor chamber 16.

The superconductor-based engine's 10 performance, safety, and reliability are significantly enhanced by an integrated control and monitoring system. FIG. 4 shows a block diagram of superconductor-based engine 10 provided with an integrated control and monitoring system 40, according to an embodiment of the invention. System 40 consists of an array of sensors 41, an Electronic Control Unit (ECU) 42, and a controlled flow valve 43, all working synergistically to oversee and optimize the engine's operation in real-time.

According to an embodiment of the invention, superconductor-based engine 10 is equipped with an assortment of sensors 41 to meticulously monitor various parameters, ensuring the linear electric generator operates within the desired conditions. Some of the key sensors and their interactions with ECU 42 may include:

Temperature Sensors 411: Placed in proximity to superconductor 13 and within superconductor chamber 16, these sensors 411 track the temperature of the superconductor 13 and the surrounding environment. If a deviation from the optimal superconducting temperature range is detected, ECU 42 quickly adjusts the flow of the chilling fluid via the flow valve to stabilize the temperature, thereby maintaining the superconductor in its optimal state.

Magnetic Field Sensors 412: These sensors measure the magnetic field strength near the superconductor 13 and the magnets 14,15. ECU 42 uses this data to monitor the alignment and oscillation of the magnets 14,15, ensuring they are functioning as intended. If an anomaly or misalignment is detected, ECU 42 can make real-time adjustments, such as modifying the chilling fluid flow to alter the superconductor's 13 state and, consequently, the magnetic field interactions.

Pressure Sensors 413: Located near intake port 21 and within superconductor chamber 16, these sensors 413 monitor the pressure of the chilling fluid. ECU utilizes this information to prevent overpressure conditions, ensuring the safety and integrity of the engine 10.

Position Sensors 414: These sensors track the position and movement of magnets 14, 15 and the elements that store mechanical energy (e.g., springs 18, 20). ECU 42 relies on this data to synchronize the engine's 10 components, optimizing the energy transfer and mechanical motion generation.

According to an embodiment of the invention, flow valve 43 can be used in regulating the chilling fluid's supply rate to the superconductor chamber 16. ECU 42 continuously adjusts the valve's position based on the real-time data received from the sensors 41, ensuring a precise and responsive control over the engine's 10 internal conditions. For example, if temperature sensors 411 detect a rise in the superconductor's 13 temperature, ECU 42 responds by opening flow valve 43 further, increasing the flow of chilling fluid to cool down the superconductor 13.

Conversely, if the temperature drops too low, ECU 42 reduces the flow to prevent excessive cooling. Additionally, the flow valve's 43 operation can be utilized in managing the engine's 10 duty cycle, ensuring that the magnets 14,15 and the elements storing mechanical energy are utilized efficiently. By fine-tuning the chilling fluid supply, ECU 42 optimizes the oscillation frequency of the magnets 14,15 and the mechanical energy storage and release, leading to enhanced performance and energy output.

It should be noted that the invention is not restricted to the use of nitrogen. It should also be noted that the use of nitrogen or other fluids can be replaced with other methods that provide the decreased temperature within the superconductor chamber, thus causing the movements of the magnets of the engine.

According to the embodiment of FIGS. 1 and 2, upon demand for energy, the chilling fluid (which is initially stored inside fluid tank 19) is injected into superconductor chamber 16. As a result, the temperature of the superconductor 13 reduces, and together with the release of springs 18, 20, magnets 14, 15 move in a linear motion. The movement of the magnets 14, 15 occurred due to the tension release of springs 18, 20 while returning to their resting state. Upon ceasing the supply of the chilling fluid, the temperature of superconductor 13 increases, and magnets 14 and 15 move toward superconductor 13 located at the center of the engine (i.e., due to the attraction force caused by the increased temperature of superconductor 13). As a result, springs 18, 20 are being stretched (i.e., tension is generated by the movement of magnets 14, 15 due to the attraction force).

According to an embodiment of the invention, the linear engine of the present invention, as illustrated in FIGS. 1 and 2, can also incorporate the use of repelling magnets to enhance the motion transmission. In certain embodiments, a pair of permanent magnets 22, 23 with opposing poles can be placed on either side of 30 superconductor 13 within chamber 16, acting as repelling magnets. These repelling magnets 22, 23 interact with the oscillating magnets attached to the springs 18, 20, creating additional force that aids in the linear motion of the system. Additionally, for increased stability and control, a second superconductor (not shown) can be placed parallel to the first, ensuring a more consistent and efficient operation.

Figure 3A:
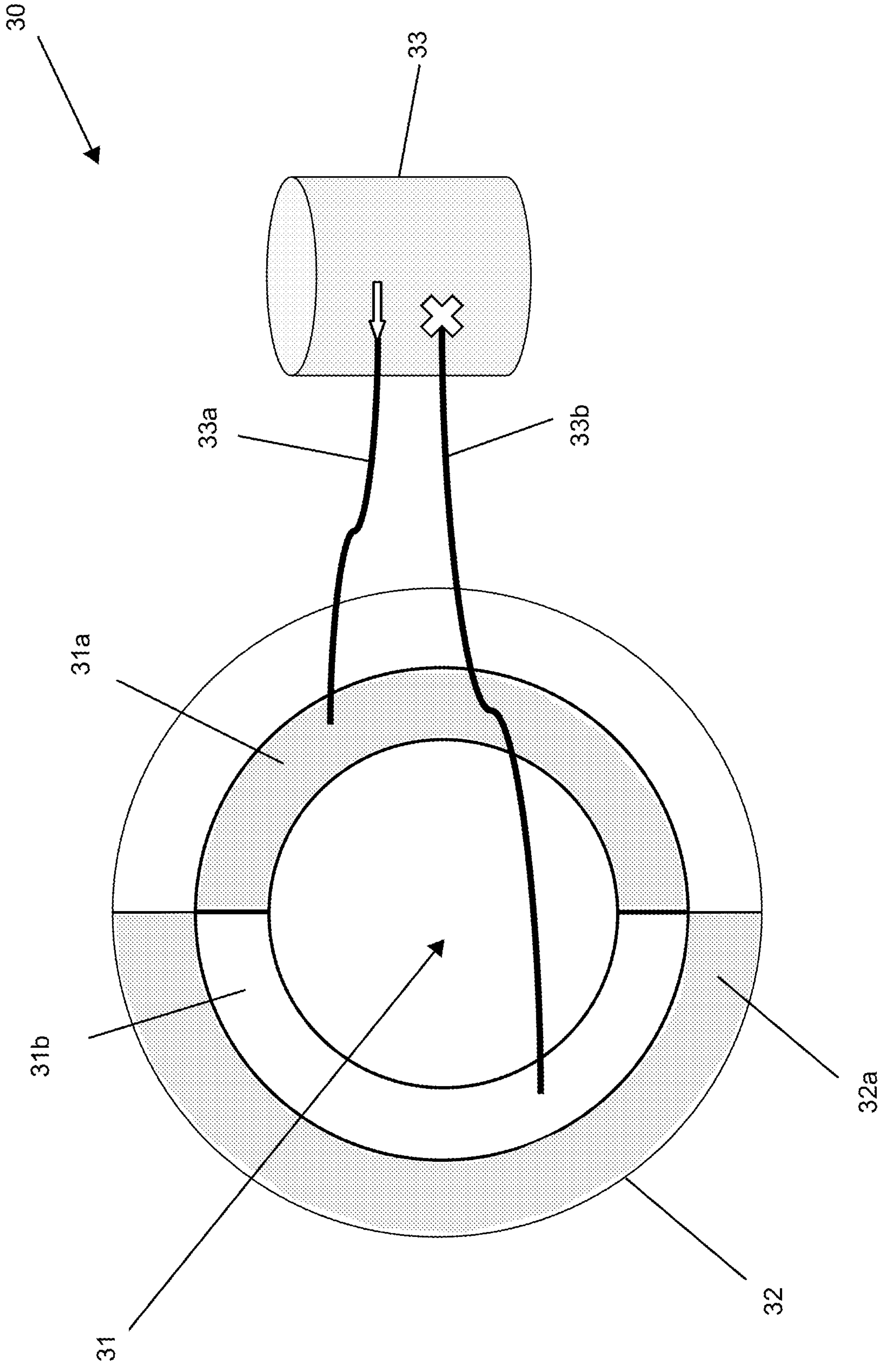
FIGS. 3A-3B schematically illustrate a rotary configuration of a superconductor-based engine, according to another embodiment of the invention.
Figure 3B:
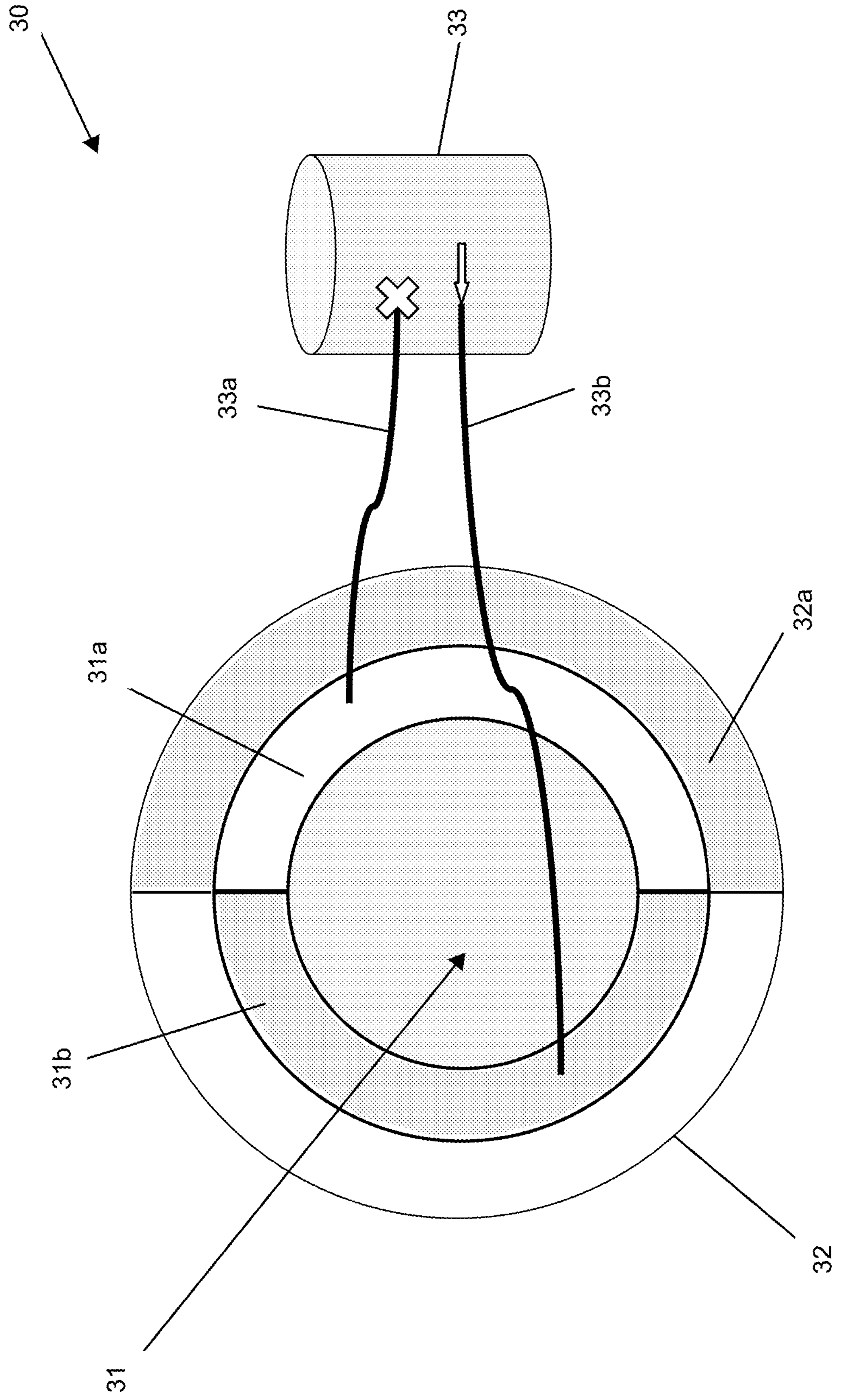

In some implementations, superconductor 13 itself can exhibit magnetic properties when in the superconducting state, further contributing to the magnetic interactions within the engine 10. This unique property allows for a more dynamic and adaptable system, responding effectively to changes in temperature and magnetic field. FIGS. 3A-3B schematically illustrate a superconductor-based engine in the form of a rotary engine 30, according to another embodiment of the invention. Engine 30 comprises an essentially round superconductor 31 that has two peripheral chambers 31*a* and 31*b* that are suitable to allow the insertion of chilling fluid (i.e., a chilling substance in a gaseous/liquid form, such as liquid nitrogen), that is suitable to chill the superconductor 31 (i.e., reduces the temperature of the superconductor 31). Superconductor 31 is concentrically confined by a rotor 32 comprising a magnetic portion 32*a*.

In this rotary engine embodiment, FIGS. 3A-3B depict two stages of the engine's operation: Initial Rotation Stage (FIG. 3A) and Subsequent Rotation Stage (FIG. 3B).

FIG. 3A illustrates a first stage that occurs when chilling fluid from a chilling fluid tank flows through tube 31*a* into chambers 31*a*, chilling the proximal portion of superconductor 31, resulting in a rotation of rotor 32 to an extent where magnetic portion 32*a* is away from the chilled portion of superconductor 31, where FIG. 3B illustrates a second stage that occurs when chilling fluid initially stored inside fluid tank 33 flows through tube 31*b* into chambers 31*b* chilling the proximal portion of superconductor 31, resulting in further rotation of rotor 32.

Suitable regulating components can control the flow of chilling fluid through either tubes 33*a* or 33*b* (e.g., a controlled flow valve), which can be managed by suitable control means for obtaining rotation of rotor 32 (e.g., at a desirable speed).

FIG. 3A shows the rotary engine 30 with the superconductor 31 in a partially superconducting state, induced by the chilling fluid entering through tube 31*a*. The induced superconducting state creates a repulsive force between the superconductor 31 and the magnetic portion 32*a* of the rotor 32, initiating a rotation. This represents the initial stage of converting thermal energy to rotational mechanical energy.

In FIG. 3B, chilling fluid now enters through tube 31*b*, further cooling the superconductor 31 and maintaining its superconducting state. The continued repulsive force between the superconductor 31 and the magnetic portion 32*a* of the rotor 32 results in further rotation. This demonstrates the engine's capability for sustained motion and energy conversion.

In the rotary engine embodiment as depicted in FIGS. 3A-3B, the superconductor serves a dual role. Not only does it act as a conduit for the transmission of mechanical motion, but it also exhibits magnetic properties when cooled to the superconducting state. This intrinsic magnetism of the superconductor interacts with the rotor, aiding in its rotational motion.

To enhance the performance and control of the rotary engine, repelling magnets can be integrated into the system. Two permanent magnets with opposing poles can be placed around the superconductor, serving as a stator that provides a stable magnetic field. Additionally, two more inverted magnets can be incorporated into the rotor, serving as the motor. These motor magnets interact with the magnetic field generated by the stator and the superconductor, resulting in a controlled and efficient rotational motion.

Furthermore, the inclusion of a second superconductor, aligned in a manner to complement the first, can be considered. This dual-superconductor configuration ensures a more balanced and reliable operation, especially under varying operational conditions.

According to an embodiment of the invention, to ensure continuous motion and overcome any potential quantum locking, the system can inject additional mechanical energy. This is done through a set of actuators connected to superconductor 13 or the object it is attached to. These actuators are controlled by ECU 42 (FIG. 4) and are activated when there is a risk of quantum locking. For example, if the sensors 41 (FIG. 4) detect that the superconductor 13 is starting to lock into place, ECU 42 will trigger the actuators to provide a precise push or pull, maintaining the motion and preventing the superconductor from coming to a stop. This mechanical energy is carefully calibrated to be just enough to overcome the resistive forces without disturbing the overall operation of the system.

In an additional embodiment of the invention, the principles of superconductor-based engine 10 are utilized to create an innovative means of controlling the interaction between a permanent magnet and an electromagnet. This embodiment of superconductor-based engine 10 applies its principles to create a unique system for controlling the interaction between a permanent magnet and an electromagnet, offering precise control and enhanced energy efficiency.

Figure 5A:
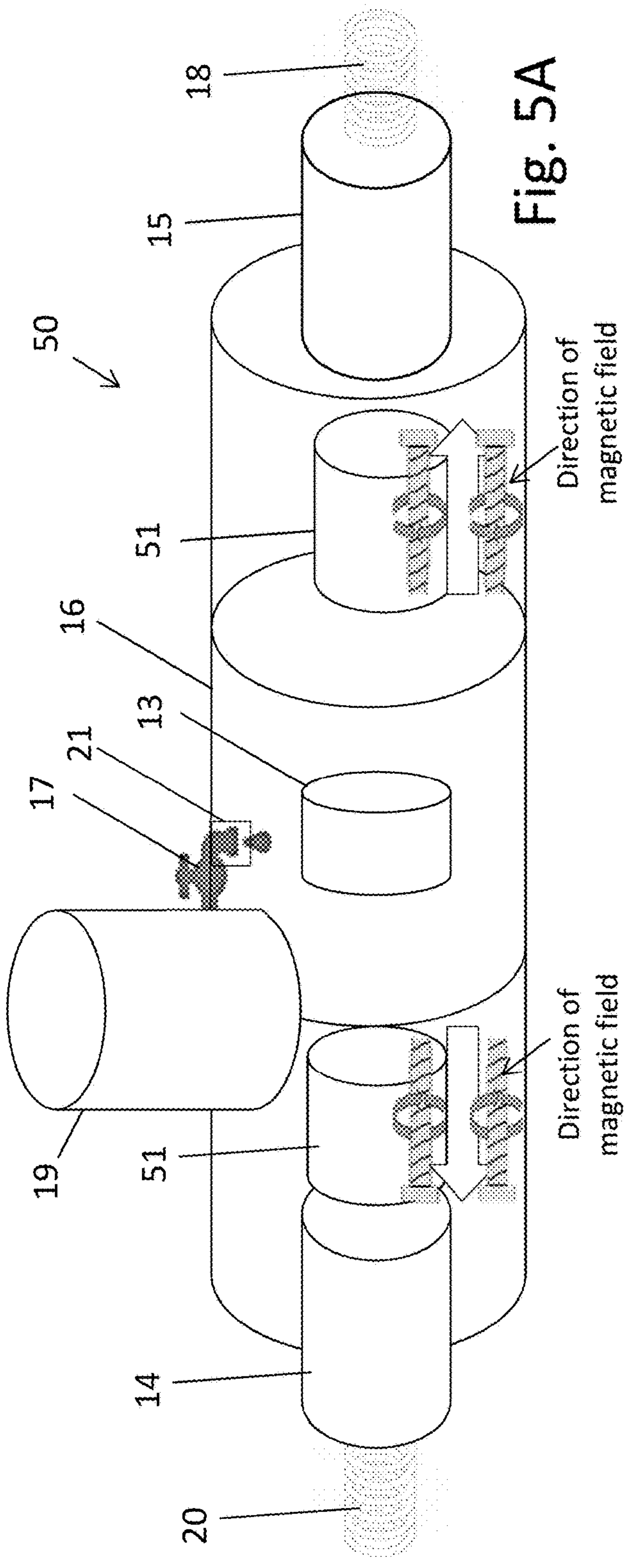
FIGS. 5A and 5B schematically illustrates superconductor-based engine provided with magnetic disruption and controlled self-magnetization of the superconductor, according to an embodiment of the invention.
Figure 5B:
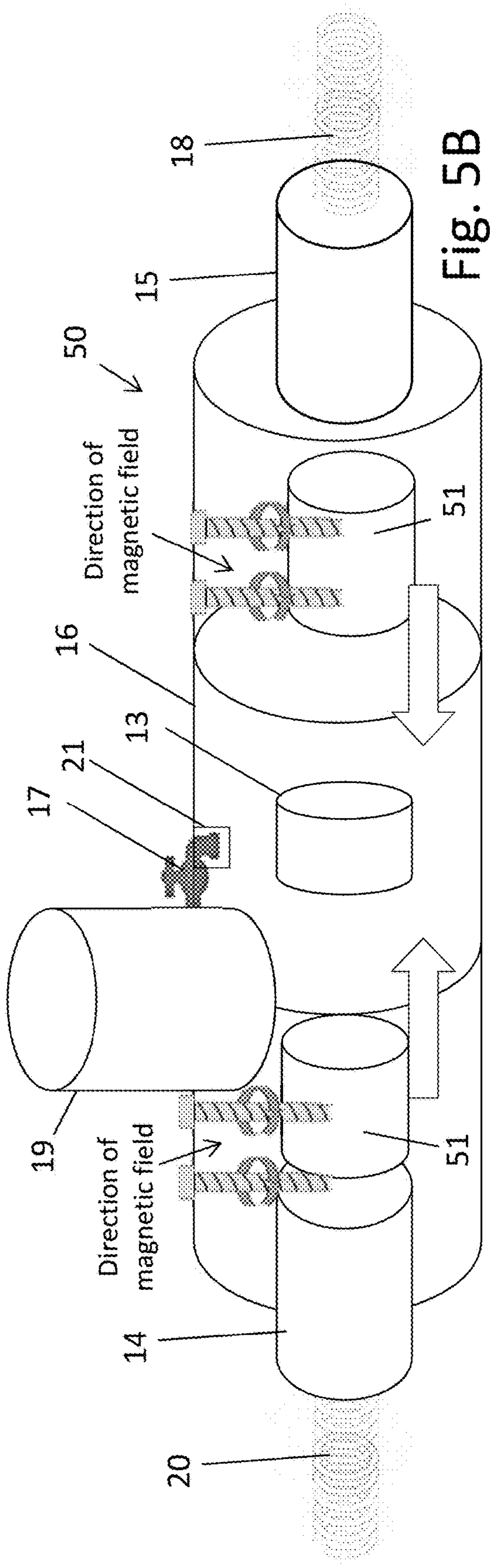

FIGS. 5A and 5B schematically illustrate superconductor-based engine provided with magnetic disruption and controlled self-magnetization of the superconductor, according to an embodiment of the invention. This embodiment of the invention pertains to a superconductor-based engine 50 wherein magnetic disruption or self-magnetization of the superconductor is employed to optimize performance and mitigate the effects of quantum locking. This is achieved through the strategic placement and orientation of stator magnets 51 around superconductor 13. FIG. 5A shows a horizontal direction of the magnetic field, while FIG. 5B shows a vertical direction of the magnetic field.

In this embodiment, stator magnets 51 are configured to produce a non-uniform magnetic field within the operating environment of the superconductor 13. As the superconductor 13 moves through this varying magnetic field, different regions of it experience fluctuations in magnetic field strength and direction. The non-uniform magnetic field is designed such that, in certain regions or under certain conditions, the magnetic field strength exceeds the critical field strength of the superconductor 13. When this occurs, the affected regions of the superconductor temporarily lose their superconducting properties, allowing magnetic flux lines to penetrate. Stator magnets 51 are precisely positioned and oriented to ensure that the disruption of the superconducting state occurs in a controlled manner. This allows for the manipulation of the magnetic interactions between the superconductor 13 and the magnets 14,15, enhancing the engine's performance and efficiency. As the superconductor 13 moves out of the high magnetic field regions or as the magnetic field itself changes, the previously disrupted regions of the superconductor 13 return to the superconducting state. This expels the magnetic flux lines and effectively demagnetizes the superconductor, ensuring that it is ready for subsequent cycles of operation.

In the default state, the stator magnets 51 are arranged such that they create a uniform magnetic field across the superconductor 13. This ensures that the superconductor remains in its superconducting state, with no magnetic flux lines penetrating its surface. The direction of the magnetic field in this state is consistent and parallel to the plane of the linear movement. To initiate magnetic disruption, the stator magnets 51 are dynamically adjusted or are intrinsically designed to create regions of non-uniform magnetic field strength. In these regions, the magnetic field exhibits a gradient, and its direction deviates from the plane of the linear movement, becoming perpendicular at points of maximum field strength. This perpendicular orientation is critical as it facilitates the penetration of magnetic flux lines into the superconductor 13 when its critical field strength is exceeded. Upon entering the high magnetic field region and experiencing disruption, the superconductor 13 undergoes self-magnetization. The direction of the magnetic field within the superconductor aligns with the external magnetic field, effectively turning the superconductor 13 into a temporary magnet. The induced magnetization direction is perpendicular to the plane of the linear movement, opposing the external magnetic field. As the superconductor 13 exits the high magnetic field region or as the external magnetic field decreases, the disrupted regions of the superconductor 13 return to the superconducting state. During this transition, the internal magnetic field within the superconductor 13 is expelled. The direction of the expelled magnetic field is opposite to that of the induced magnetization, facilitating a quick return to the superconducting state and ensuring that the superconductor is demagnetized and ready for subsequent cycles.

This embodiment allows for fine-tuned control over the magnetic interactions in the engine, optimizing performance and energy transfer. The controlled disruption of superconductivity prevents the superconductor 13 from becoming quantum locked, ensuring continuous and smooth operation. The ability to dynamically adjust the magnetic properties of the superconductor 13 leads to a more stable and responsive engine, particularly in variable operating conditions. Moreover, by reducing energy losses associated with quantum locking and enhancing the magnetic interactions, this embodiment contributes to the overall efficiency of the engine. In conclusion, this embodiment introduces a novel approach to superconductor-based engine design, leveraging magnetic disruption and controlled self-magnetization to optimize performance, prevent quantum locking, and enhance the stability and efficiency of the system.

Figure 6A:
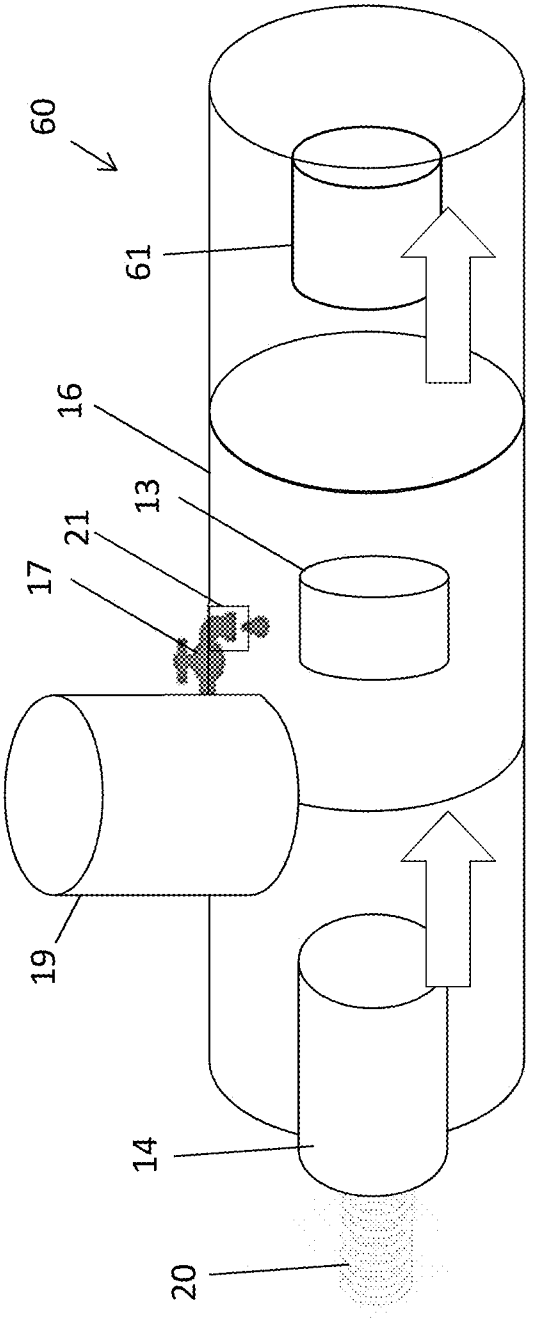
FIGS. 6A and 6B schematically illustrate a superconductor-based engine configured to mitigate the effects of quantum locking, according to another embodiment of the invention.
Figure 6B:
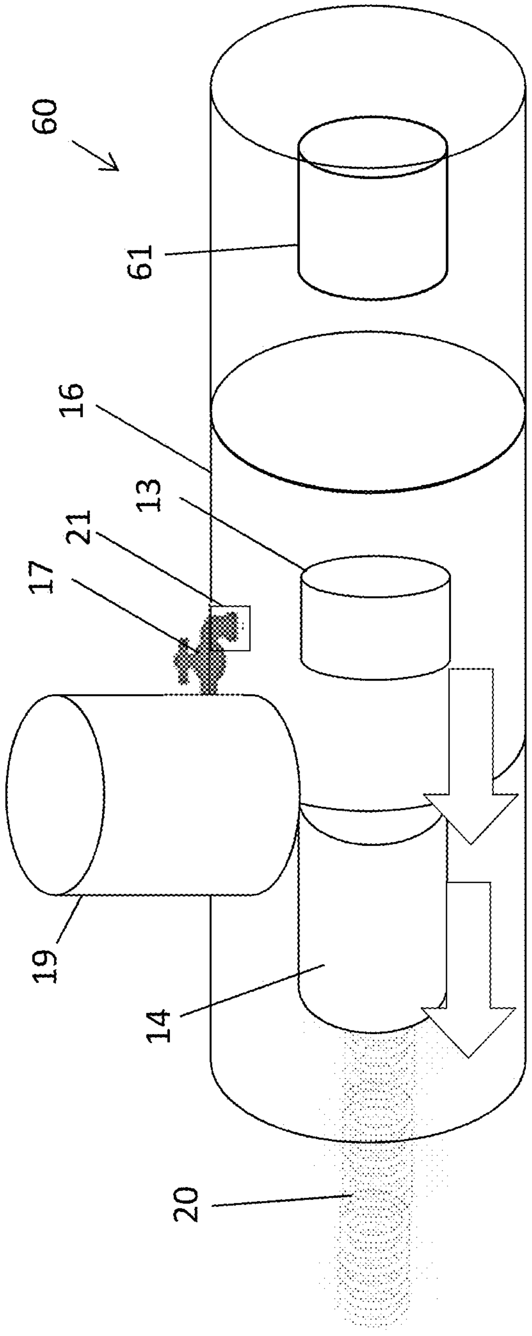

FIGS. 6A and 6B schematically illustrate a superconductor-based engine 60 configured to mitigate the effects of quantum locking, according to another embodiment of the invention. This embodiment of the invention pertains to superconductor-based engine 60 wherein magnetic disruption or self-magnetization of the superconductor is employed to optimize performance and mitigate the effects of quantum locking. In this embodiment a magnet or an electromagnet 61 is utilized to magnetize the superconductor 13 in a desired linear direction (FIG. 6A) and in an opposite linear direction (FIG. 6B).

Along with the description, references are made to "fluid", and it should be noted that the phrase refers to any fluid, gas or liquid, such as air, hydraulic fluid, a mixture of gases, etc. According to some embodiments of the invention, the fluid that flows into the superconductor chamber is redirected toward the superconductor.

Although embodiments of the invention have been described by way of illustration, it will be understood that the invention may be carried out with many variations, modifications, and adaptations without exceeding the scope of the claims.

The invention claimed is:

1. A superconductor-based engine comprising:
- a temperature-controlled superconductor configured to achieve a superconducting state when cooled to very cold temperatures by a chilling fluid;
- a chamber housing the superconductor;
- an intake port for introducing a chilling fluid into said chamber to reduce the temperature of the superconductor;
- a first pair of permanent magnets having opposing poles placed on either side of the superconductor to provide a stable magnetic field;
- at least one second pair of magnets positioned in proximity to the superconductor;
- at least one pair of mechanical energy storage elements attached to the second pair of magnets, wherein the storage elements exert an opposing force approximately proportional to their change in length; and
- an electronic control unit configured to regulate the introduction of the chilling fluid into the chamber based on feedback from at least one sensor monitoring the engine's performance, to alternately transition the superconductor between the superconducting state and a non-superconducting state, thereby maintaining a continuous oscillatory motion of the second pair of magnets.

2. The superconductor-based engine of claim 1, wherein the engine is in the form of a linear electric generator.

3. The superconductor-based engine of claim 1, wherein the engine is in the form of a rotary engine comprising a stator, a rotor, and the temperature-controlled superconductor acting as a source for mechanical motion transmission between the stator and the rotor.

4. The superconductor-based engine of claim 1, wherein the mechanical energy storage elements are selected from a group consisting of springs and elastic objects.

5. The superconductor-based engine of claim 1, wherein the chilling fluid is nitrogen.

6. The superconductor-based engine of claim 1, wherein the motion of the magnets is achieved and maintained through a combination of the superconductor's transition between superconducting and non-superconducting states, and the mechanical energy storage elements.

7. The superconductor-based engine of claim 1, wherein the engine is configured to operate in cycles of cooling and warming of the superconductor to achieve repeated mechanical motion.

8. A method of operating a superconductor-based engine, comprising:

introducing a chilling fluid into a superconductor chamber to cool a superconductor to a superconducting state;

utilizing the superconductor in the superconducting state to generate a mechanical motion;

converting the mechanical motion to electrical energy; and regulating the introduction of the chilling fluid based on feedback from sensors monitoring the engine's performance to alternately transition the superconductor between the superconducting state and a non-superconducting state, thereby maintaining a continuous oscillatory mechanical motion.

9. The method of claim 8, wherein the mechanical motion is linear motion in the case of a linear electric generator, or rotational motion in the case of a rotary engine.

* * * * *